(12) United States Patent
Pn

(10) Patent No.: US 9,336,222 B2
(45) Date of Patent: May 10, 2016

(54) CREATION AND ACCESS OF QUOTA TREES IN A FILE SYSTEM

(75) Inventor: Niranjan Pn, Karnataka (IN)

(73) Assignee: NetApp, Inc., Sunnyvale, CA (US)

( * ) Notice: Subject to any disclaimer, the term of this patent is extended or adjusted under 35 U.S.C. 154(b) by 833 days.

(21) Appl. No.: 13/198,993

(22) Filed: Aug. 5, 2011

(65) Prior Publication Data
US 2014/0081979 A1    Mar. 20, 2014

(51) Int. Cl.
| G06F 7/00 | (2006.01) |
| G06F 17/30 | (2006.01) |
| G06F 12/00 | (2006.01) |
| G06F 13/00 | (2006.01) |
| G06F 13/28 | (2006.01) |
| G06F 9/26 | (2006.01) |
| G06F 9/34 | (2006.01) |

(52) U.S. Cl.
CPC ................................ G06F 17/30138 (2013.01)

(58) Field of Classification Search
None
See application file for complete search history.

(56) References Cited

U.S. PATENT DOCUMENTS

| 5,819,292 | A  | * | 10/1998 | Hitz | .................... | G06F 11/1435 |
| | | | | | | 707/999.203 |
| 6,643,654 | B1 | * | 11/2003 | Patel | ................. | G06F 17/30067 |
| | | | | | | 707/10 |
| 7,437,360 | B1 | * | 10/2008 | Chitre et al. | ...................... | 707/8 |
| 7,721,062 | B1 | * | 5/2010 | Fair | ..................... | G06F 11/1435 |
| | | | | | | 707/690 |
| 7,739,614 | B1 | * | 6/2010 | Hackworth | ......... | G06F 11/3495 |
| | | | | | | 715/771 |
| 8,554,809 | B1 | * | 10/2013 | Zhou | ................. | G06F 17/30082 |
| | | | | | | 707/821 |
| 2005/0050107 | A1 | * | 3/2005 | Mane et al. | ................... | 707/200 |
| 2006/0112151 | A1 | * | 5/2006 | Manley et al. | ................ | 707/201 |

* cited by examiner

*Primary Examiner* — Scott A Waldron
*Assistant Examiner* — Cheryl M Shechtman
(74) *Attorney, Agent, or Firm* — Mahamedi Paradice LLP

(57) ABSTRACT

A method of identifying metadata referenced by a quota tree. A quota tree metafile is accessed, and this quota tree metafile includes references to locations of inode grouped data structures associated with quota trees. Here, each quota tree is allocated an inode grouped data structure. A reference to a location of an inode grouped data structure that is allocated to the quota tree is identified from the quota tree metafile. The inode grouped data structure is accessed based on the reference, and this inode grouped data structure defines a set of inode identifiers associated with the quota tree. An inode grouped data structure that stores the metadata is then located using the set of inode identifiers as index.

21 Claims, 12 Drawing Sheets

CREATION AND ACCESS OF QUOTA TREES IN A FILE SYSTEM

FIELD

The present disclosure relates generally to information storage. In an exemplary embodiment, the disclosure relates to access and creation of quota trees in a file system.

BACKGROUND

A storage quota is an allocation of storage. A quota tree is a subtree in a volume's file system, and such a quota tree can be used to index storage quotas or other metadata. As an example, a quota tree creates a subset of a volume to which a quota can be applied to limit its size. Many conventional file systems maintain a single table from which all metadata associated with different quota trees are stored. Even though a file system can be subdivided into different quota trees as an independent partition, the quota trees still share a common table. As a result, conflict may arise if one particular quota tree needs a particular inode on a file system, but that particular inode is in use by another quota tree.

For example, a single volume can be used as a backup destination for multiple quota trees residing on different volumes. However, when a quota tree is copied to this single volume, the inode identifiers corresponding to the quota tree may already have been allocated to another file residing in another quota tree. As a result, an exact copy of the quota tree having identical inode identifiers may not be stored in this different volume. Instead, the quota trees are assigned different inode identifiers when stored in this different volume, and the file system needs to store information about the correlation of the inode identifiers such that the original inode identifiers can be reconstructed in case the quota tree needs to be restored from the different volume.

In another example, in logical replication, a database that stores correlation information needs to be updated for each copy of a quota tree. Due to this constraint, cascade copies cannot be made. That is, the destination volume cannot be copied again. For example, a quota tree is stored on a "first" volume while a secondary copy of the quota tree is stored on a "second" volume. A tertiary copy of the quota tree is stored in a "third" volume. Here, the secondary copy is used to make the tertiary copy. In case the secondary copy fails, the tertiary copy cannot be used to restore the quota tree because the tertiary copy does not have any correlation information on the quota tree stored in the first volume. The tertiary copy only has correlation information on the secondary copy, but this secondary copy is now inaccessible.

SUMMARY

Exemplary embodiments of the present invention provide various techniques for creating and accessing quota trees in a file system. Generally, instead of having one single data structure shared by all quota trees across a file system, embodiments of the present invention provide an inode grouped data structure for each quota tree. This inode grouped data structure stores various metadata of data containers associated with its quota tree. The allocation of a metafile for each quota tree allows each quota tree to maintain its own index of inode identifiers, which are used to locate the metadata. Given that the inode identifiers are maintained per quota tree, different quota trees can have the same inode identifiers. For example, a copy of a quota tree can have a set of inode identifiers that are identical to the inode identifiers of a source quota tree because the inode identifiers are stored in different inode grouped data structures, thereby avoiding any potential conflicts of inode identifiers.

Accordingly, when a quota tree is restored from a backup copy, such a restoration operation is simplified because the inode identifiers of the backup copy are identical to the inode identifiers of the source quota tree. The restoration operation is simplified because the inode identifiers of the backup copy do not need to be renumbered to match the original inode identifiers of the source quota tree. Furthermore, embodiments of the present invention also eliminate the need to store correlation information used in the renumbering. By allowing quota trees to have identical inode identifiers, embodiments of the present invention support fan-in and cascade copies of quota trees. In a fan-in copy, quota trees stored in different volumes can be copied to a single volume. In a cascade copy, a secondary copy of a primary quota tree is used to create a tertiary copy. Methodologies to create and access quota trees having their own inode grouped data structures in accordance with exemplary embodiments of the present invention are also described.

BRIEF DESCRIPTION OF DRAWINGS

The present disclosure is illustrated by way of example and not limitation in the figures of the accompanying drawings, in which like references indicate similar elements and in which.

DESCRIPTION OF EXEMPLARY EMBODIMENTS

The description that follows includes illustrative systems, methods, techniques, instruction sequences, and computing machine program products that embody the present invention. In the following description, for purposes of explanation, numerous specific details are set forth in order to provide an understanding of various embodiments of the inventive subject matter. It will be evident, however, to one skilled in the art that embodiments of the inventive subject matter may be practiced without these specific details. In general, well-known instruction instances, protocols, structures and techniques have not been shown in detail. Furthermore, the term "exemplary" is construed merely to mean an example of something or an exemplar and not necessarily a preferred or ideal means of accomplishing a goal.

Figure 1:
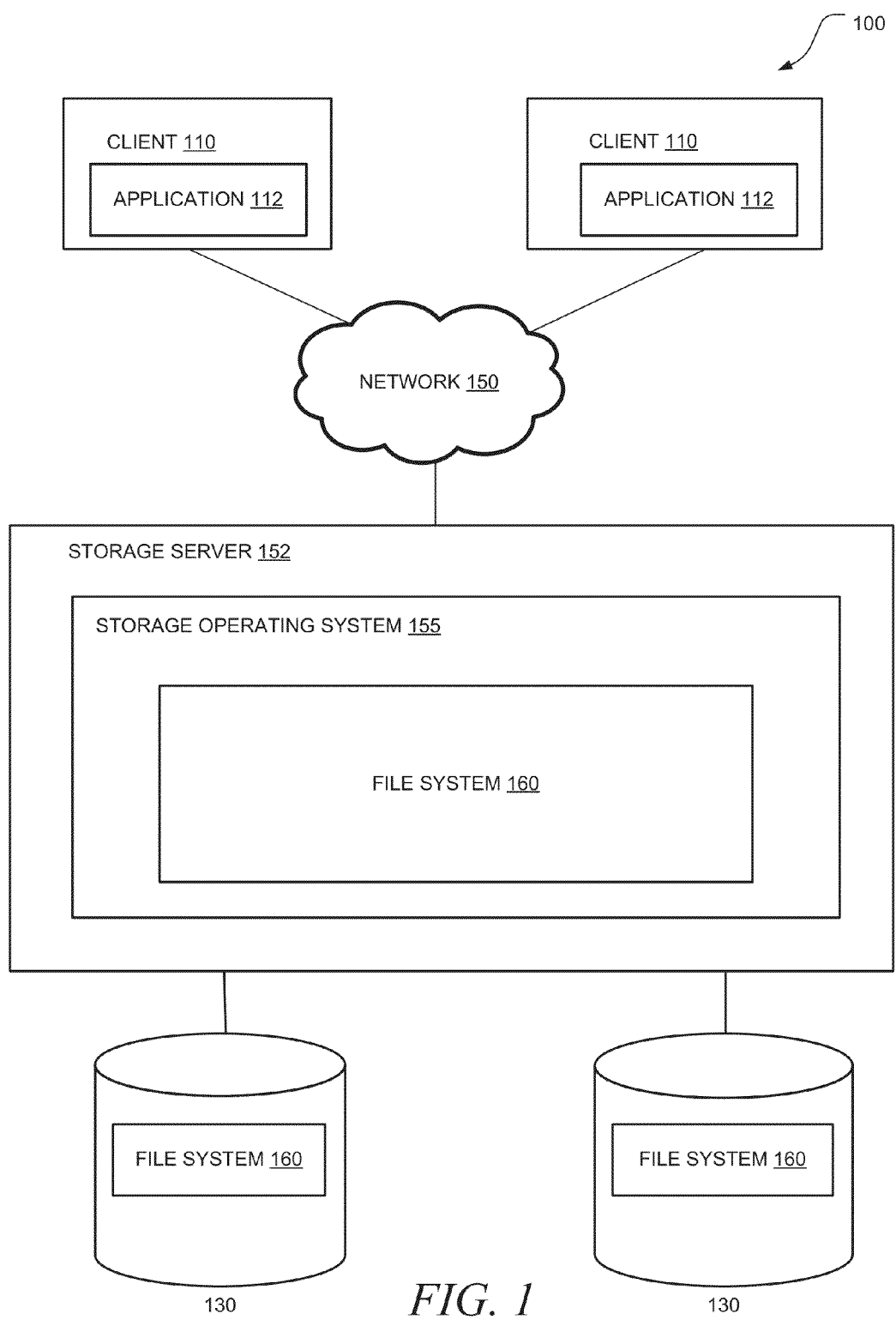
FIG. 1 is a schematic block diagram of a network environment, in accordance with an exemplary embodiment.

FIG. 1 is a schematic block diagram of a network environment 100, in accordance with an exemplary embodiment. As depicted, the network environment 100 includes client computing devices 110, a storage server 152, and storage devices 130. The storage server 152 is a computing device that provides file-based service or block-based service relating to the organization of information on storage devices 130, such as non-volatile memories, tapes, and disks. A file server is an example of a storage server 152. The storage server 152 may be embodied as a storage system including a storage operating system 155 that implements one or more file systems 160 to logically organize the information as a hierarchical structure of directories and data containers on the storage devices 130. Each data container may be implemented as a file or generally a set of data structures (e.g., disk blocks) configured to store information, such as the actual data for the file. A directory, on the other hand, may be implemented as a specially formatted data container in which information about other data containers and directories are stored.

Each client computing device 110 is configured to execute one or more applications 112. Moreover, each client computing device 110 may interact with the storage server 152 in accordance with a client/server model of information delivery. That is, the client computing devices 110 may request the services of the storage server 152, and the storage server 152 may return the results of the requested services by exchanging packets encapsulated in, for example, Common Internet File System (CIFS) protocol or Network File System (NFS) protocol format over network 150.

Storage of information on the storage server 152 can be implemented as one or more storage "volumes" that comprise a cluster of storage devices 130, defining an overall logical arrangement of disk space. Each volume is generally associated with its own file system 160. To facilitate access to the storage devices 130, the storage operating system 155 implements a file system that logically organizes the information as a hierarchical structure of directories and data containers on the storage devices 130. Each "on-disk" data container may be implemented as a set of disk blocks configured to store information, such as data, whereas the directory may be implemented as a specially formatted data container in which names and links to other data containers and directories are stored. In the illustrative embodiment described herein, the storage operating system 155 can be, for example, NETAPP Data ONTAP®, which is available from NetApp, Inc. located in Sunnyvale, Calif., or UNIX operating system that implements a file system.

In the illustrative embodiment, the storage operating system 155, portions of which are typically resident in memory and executed by the processing elements of the storage server 152, functionally creates and accesses one or more quota trees. A "quota tree," as implemented on an exemplary storage system such as described herein, is a subtree in a volume's file system 160. A quota tree creates a subset of a volume to which a storage quota can be applied to limit its size. A storage quota refers to an allocation of storage allotted to, for example, a user, a group, and/or a directory. As an example, a user may be allotted a storage quota of 500 MB of storage space. Quota trees represent another level of abstraction at which a storage device can be partitioned. Storage devices are organized into aggregates, which provide pools of storage. In each aggregate, one or more flexible volumes can be created, and each volume can be divided into one or more quota trees.

Here, the storage operating system 152 sets up an inode grouped data structure for each quota tree in a file system 160. Each inode grouped data structure, as explained in more detail below, defines a set of inode identifiers assigned to a particular quota tree. With each quota tree having its own inode grouped data structure, each quota tree can be copied to or duplicated in a different volume while still maintaining its inode identifiers.

Figure 2:
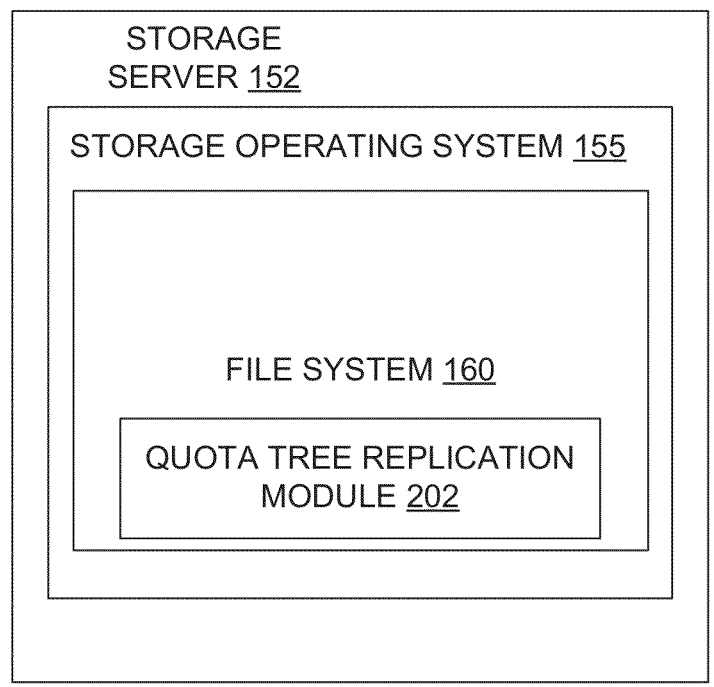
FIG. 2 is a block diagram depicting various modules, in accordance with an exemplary embodiment, included in a storage server.

FIG. 2 is a block diagram depicting various modules, in accordance with an exemplary embodiment, included in a storage server 152. Here, the storage server 152 may be included in a storage environment, such as forming a part of the storage environment 100 depicted in FIG. 1. Referring to FIG. 2, in various embodiments, the storage server 152 may be used to implement computer programs, logic, applications, methods, processes, or software to create and access quota trees, as described in more detail below.

The storage server 152 executes a storage operating system 155 that manages other processes and/or services executing on the storage server 152. In one embodiment, the storage operating system 155, as also depicted in FIG. 1, includes a file system 160 that includes a quota tree replication module 202. In general, the quota tree replication module 202 is configured to create and access quota trees using the file system 160. Instead of a single data structure shared by all quota trees across the file system 160, a data structure for each quota tree is allocated in the file system 160. This data structure, which is also referred to as an "inode grouped data structure," is a metafile that stores metadata of data containers associated with a single quota tree. Examples of metadata include storage quotas, permissions, user identifiers, group identifiers, and other metadata. It should be noted that an inode identifier is used internally within the file system to identify the inode associated with the data container. An inode number is an example of an inode identifier. An "inode" is a data structure used to store the metadata of one or more data containers. The inode includes a set of pointers to blocks within a file system. For data containers, such as files, the inode may directly point to blocks storing the data of the file. Given that an inode is a data structure, it should be noted that the terms "inode" and "inode data structure" may be used interchangeably.

An "inode grouped data structure" therefore comprises a set of "inode data structures," with each inode data structure storing a set of metadata. Each inode data structure can be indexed within the inode grouped data structure by inode identifiers. In other words, inode identifiers are indexes within an inode grouped data structure and each index specify one of many inode data structures. Accordingly, each inode grouped data structure stores a set of inode identifiers and a set of corresponding inode data structures. The following Table A is an example of an inode grouped data structure as embodied in a table:

TABLE A

| Inode identifier | Inode Data Structure |
| --- | --- |
| 0 | Type |
|   | Permission |
|   | Storage Quota |
|   | User Identifier and Group Identifier |
| 1 | Type |
|   | Permission |
|   | Storage Quota |
|   | User Identifier and Group Identifier |

In effect, the inode identifier can be used to index the metadata. It should be appreciated that a "data structure" provides context for the organization of data. Examples of data structures include tables, arrays, linked lists, databases, and other data structures. Mode identifiers can be used as index within tables, but it should be appreciated that other indexes may also be used within other data structures.

As explained in more detail below, the allocation of an inode grouped data structure for each quota tree allows each quota tree to maintain its inode identifiers. As a result, multiple copies of a single quota tree can be created having inode identifiers that are identical to the single quota tree, thereby possibly simplifying the restoration of a quota tree from a copy because, for example, the inode identifiers do not need to be reconstructed to match the inode identifiers of the single quota tree.

It should be appreciated that in other embodiments, the storage server 152 may include fewer or more modules apart from those shown in FIG. 2. For example, in an alternate embodiment, the quota tree replication module 202 can be further divided into multiple modules. The quota tree replication module 202 may be in the form of software that is processed by a processor. In another example, as explained in more detail below, the quota tree replication module 202 may be in the form of firmware that is processed by application specific integrated circuits (ASICs), which may be integrated into a circuit board. Alternatively, the quota tree replication module 202 may be in the form of one or more logic blocks included in a programmable logic device (for example, a field programmable gate array). The described module 202 may be adapted, and/or additional structures may be provided, to provide alternative or additional functionalities beyond those specifically discussed in reference to FIG. 2. Examples of such alternative or additional functionalities will be discussed in reference to the flow diagrams discussed below.

Figure 3:
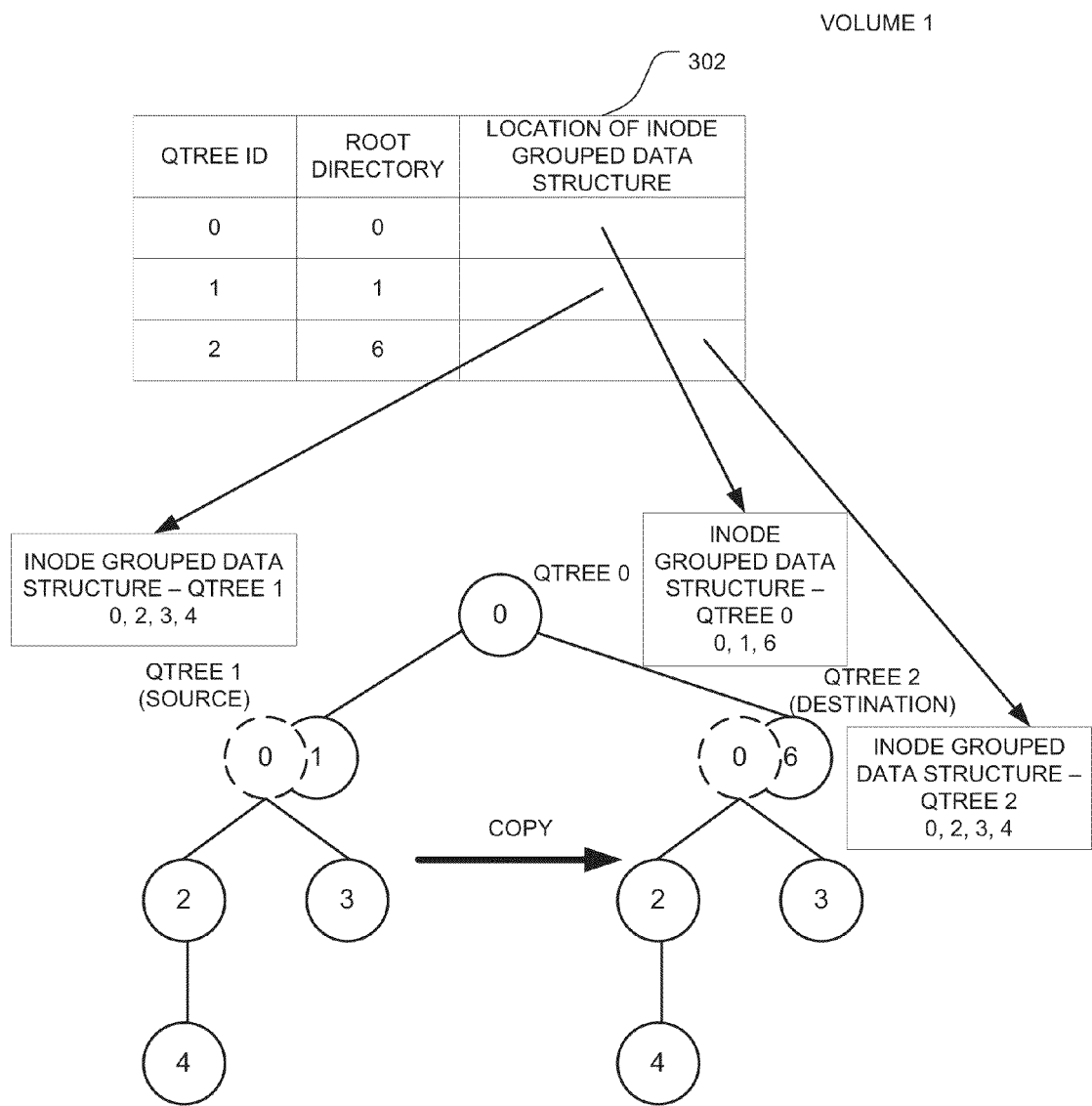
FIG. 3 is a diagram illustrating the creation and copy of a quota tree within a volume, in accordance with an exemplary embodiment.

FIG. 3 is a diagram illustrating the creation and copy of a quota tree within a volume, in accordance with an exemplary embodiment. When a file system is created, a quota tree metafile 302 is created. This quota tree metafile 302 stores various information regarding all quota trees in a single volume (e.g., volume 1). In one embodiment, the quota tree metafile 302 stores information such as quota tree identifiers ("QTREE ID"), root directory inode identifiers ("ROOT DIRECTORY"), and references to locations of inode grouped data structures ("LOCATION OF NODE GROUPED DATA STRUCTURE"). The quota tree identifier is a value that uniquely identifies a single quota tree. For example, as depicted in FIG. 3, the quota tree metafile 302 includes a "QTREE ID" column of three quota tree identifiers 0, 1, and 2 that uniquely identify quota tree 0, quota tree 1, and quota tree 2, respectively. Given that the quota tree identifiers uniquely identify quota trees, the values stored in the "QTREE ID" column are unique. That is, the quota tree metafile 302 is setup such that no two distinct rows of quota tree identifiers can have the same value.

A root directory inode identifier (or "root inode identifier") is a reserved inode identifier that uniquely identifies a root directory. In this example, inode identifier 0 is used to identify the root directory. It should also be noted that a "root directory" refers to the first or top-most directory in a hierarchy. For example, in UNIX systems, the root directory is denoted by the directory separator character "/." Though the root directory is conventionally referred to as "/," the actual directory entry itself has no name because its name is the empty part before the initial directory separator character "/." A file system may also have multiple root directories. As an example, in the Open Virtual Memory System operating system, a root directory refers to a directory in which all the user's data containers are stored. With multiple users, the file system includes multiple root directories.

In this example, quota tree identifier 0 refers to a quota tree that starts from a root of the file system. Thus, other quota trees reside inside quota tree 0. That is, quota trees start from one of the directories in quota tree 0. This directory maps to the root directory of each quota tree, and only one quota tree can be created under a directory. A root directory inode identifier in the quota tree metafile 302 therefore refers to an inode identifier in the quota tree 0 that uniquely identifies a particular root directory of other quota trees in the file system, the root directory of which provides indirection or access to these other quota trees. Thus, the values stored in the "ROOT DIRECTORY" column of the quota tree metafile 302 are also unique. As depicted in FIG. 3, given that the data included in each row of the quota tree metafile 302 are associated with each other, the quota tree metafile 302 includes a "ROOT DIRECTORY" column of three root directory inode identifiers 0, 1, and 6 that uniquely identify the root directory associated with quota tree 0, the root directory associated with quota tree 1, and the root directory associated with quota tree 2, respectively.

The inode grouped data structure column of the quota tree metafile 302 stores references to locations of inode grouped data structures that are associated with their respective quota tree identifiers and root directory inode identifiers. As previously discussed, each inode grouped data structure stores the metadata of data containers residing in the corresponding quota tree and inode identifiers used to index the inode structures that store the metadata. For example, as depicted in FIG. 3, the inode structures (or metadata itself) referenced by quota tree 1 (or "QTREE 1") are indexed by inode identifiers 0, 2, 3, and 4, and these inode identifiers are also stored in an inode grouped data structure assigned to quota tree 1. Similarly, the inode structures referenced by quota tree 0 (or "QTREE 0") are indexed by inode identifiers 0, 1, and 6, and these inode identifiers are stored in an inode grouped data structure assigned to quota tree 0.

In accordance with exemplary embodiments of the present invention, the inode grouped data structures are allocated from the free blocks or from the quota tree metafile 302. In particular, the inode grouped data structures are allocated based on available root directory inode identifiers and quota tree identifiers in the quota tree metafile 302, with a single inode grouped data structure allocated for each quota tree. For example, as depicted in FIG. 3, an inode grouped data structure is allocated to quota tree identifier 0 with root directory inode identifier 0. Another inode grouped data structure is allocated to quota tree identifier 1 with root directory inode identifier 1. The "LOCATION OF INODE GROUPED DATA STRUCTURE" column of the quota tree metafile 302 stores references to locations of the inode grouped data structures in the file system. An example of such a reference can be a block number to a particular inode grouped data structure. Another example of such a reference can be an inode identifier of the data container having inode grouped data structure.

From the quota tree metafile 302 and the inode grouped data structures, the quota trees, such as quota tree 0 and quota tree 1, can be constructed. For example, the quota tree metafile 302 defines a quota tree identifier 0 assigned to a particular quota tree 0, and it has a root directory identified or indexed by inode identifier 0. From reading the inode grouped data structure associated with quota tree 0, this quota tree 0 has inode identifiers 0, 1, and 6, and each inode identifier 0, 1, or 6 can be used to identify a unique quota tree, namely quota tree 0, 1, or 2. Furthermore, the quota tree identifiers associated with inode identifiers 0, 1, and 6 can be used as an index into the root directory inode identifiers 0, 1, and 6. As an example, the quota tree identifier 2, which is associated with root directory inode identifier 6, references a location of the inode grouped data structure associated with quota tree 2. The inode grouped data structure associated with quota tree 1 includes inode identifiers 0, 2, 3, and 4, which are used as an index to locate metadata associated with quota tree 1.

By allocating an inode grouped data structure for each quota tree, a quota tree can be copied with its inode identifiers intact. That is, a quota tree can be copied without modifying or renumbering its inode identifiers. In the example depicted in FIG. 3, quota tree 2 is a copy of quota tree 1, which has inode identifiers 0, 2, 3, and 4. Given that the inode grouped data structures can store any inode identifiers, the inode identifiers stored in the inode grouped data structures allocated to quota tree 1 and quota tree 2 can be identical (e.g., both storing inode identifiers 0, 2, 3, and 4). At the same time, the existing constraints that the values of the quota tree identifiers and the root directory inode identifiers are unique, which are imposed by the quota tree metafile 302, can be preserved.

Figure 4:
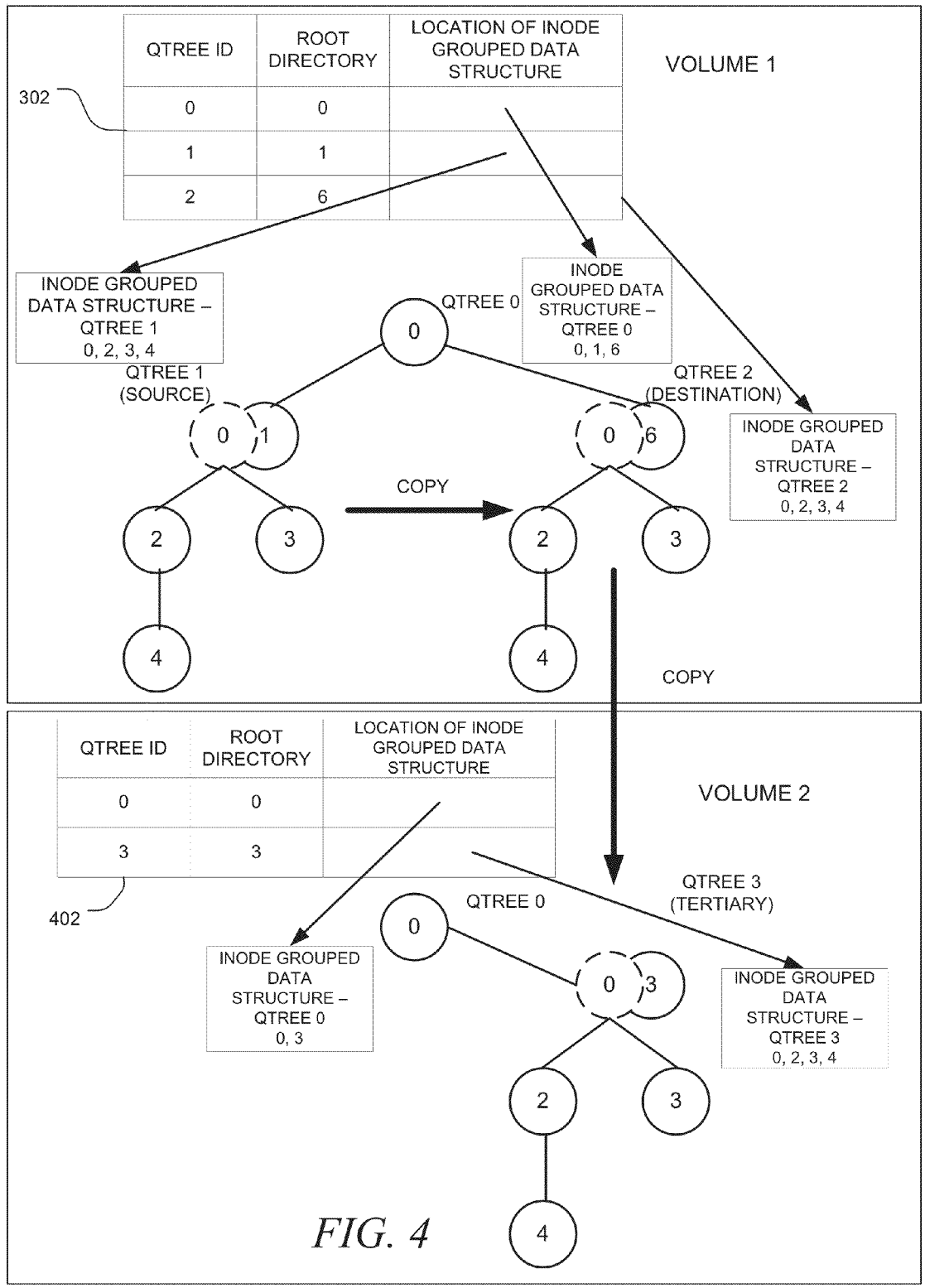
FIG. 4 is a diagram depicting a copy of a quota tree in a different volume, in accordance with an exemplary embodiment of the present invention.

FIG. 4 is a diagram depicting a copy of a quota tree in a different volume, in accordance with an exemplary embodiment of the present invention. In addition to making a copy of a quota tree within a single volume, a copy of the quota tree can also be made on a different volume. For example, as depicted in FIG. 4 and previously described in FIG. 3, quota tree 2 is a copy of quota tree 1, which is in volume 1. Additionally, quota tree 1 can also be copied to a different volume 2. When a file system for volume 2 is created, a quota tree metafile 402 for volume 2 is also created. Similar to the quota tree metafile 302 associated with volume 1, quota tree metafile 402 also stores various information regarding all quota trees in volume 2, such as quota tree identifiers, root directory inode identifiers, and references to locations of inode grouped data structures.

Here, the quota tree 2 that is stored in volume 1, which is a copy of quota tree 1, can be copied to volume 2 as quota tree 3 while maintaining the inode identifiers 0, 2, 3, and 4 originally allocated to quota trees 1 and 2. This quota tree 3 is therefore a tertiary copy of quota tree 1. To make a copy of quota tree 2 in volume 2, an inode grouped data structure is allocated for quota tree 3 from the quota tree metafile 402. Given that quota tree 3 is a copy of quota trees 1 and 2, the inode grouped data structure associated with quota tree 3 includes a set of inode identifiers 0, 2, 3, and 4 that are identical to the inode identifiers assigned to quota trees 1 and 2.

In reference to quota tree metafile 402, quota tree 0, which is identified by quota tree identifier 0, is associated with root directory inode identifier 0. The quota tree metafile 402 references an inode grouped data structure for quota tree 0 that includes inode identifiers 0 and 3. In turn, quota tree identifier 3, which is associated with root directory inode identifier 3, can be used as an index into quota tree metafile 402 to identify a reference to a location of an inode grouped data structure associated with quota tree 3. This inode grouped data structure associated with quota tree 3 includes the set of inode identifiers 0, 2, 3, and 4.

Figure 5:
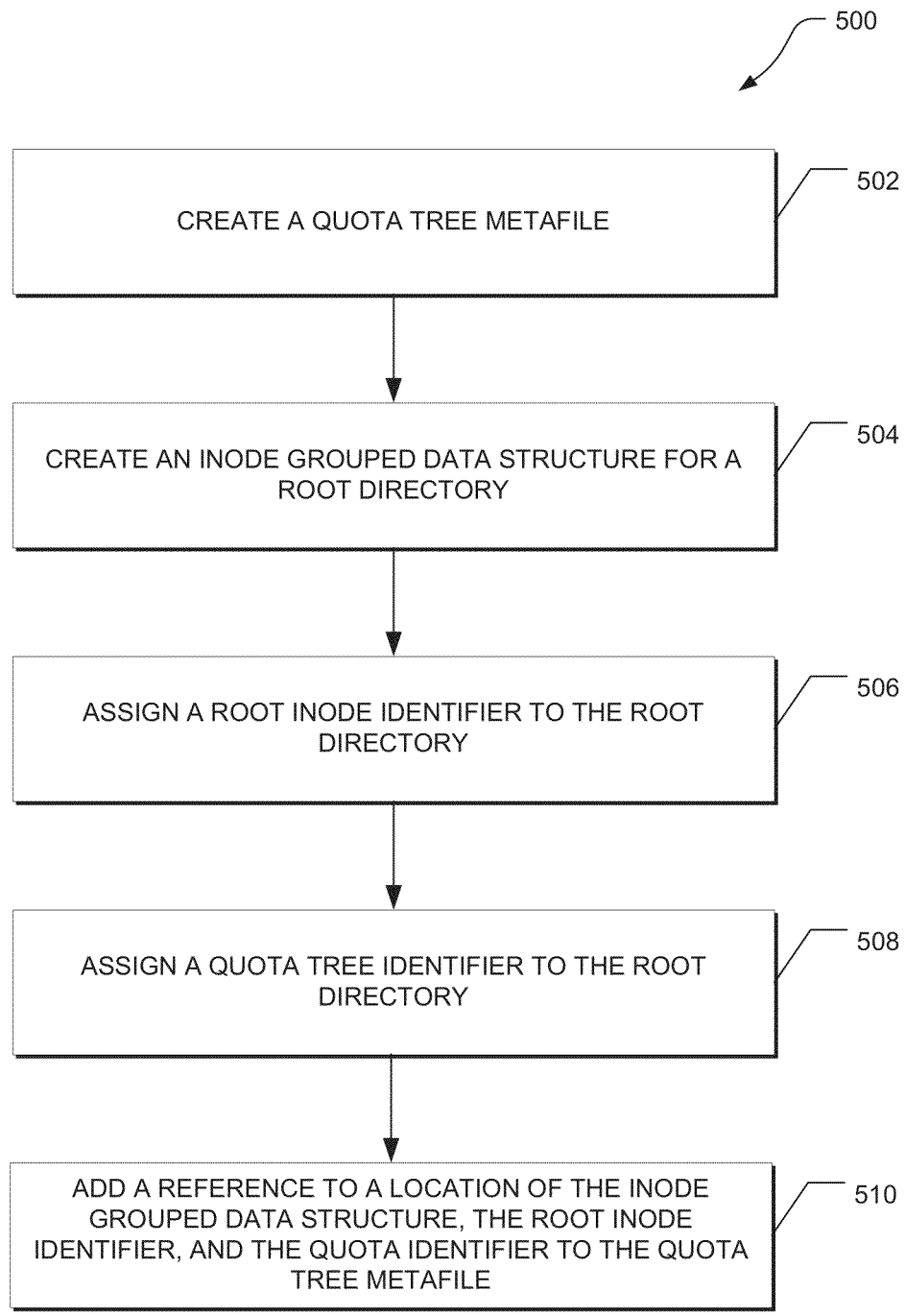
FIG. 5 is a flow diagram of a general overview of a method, in accordance with an exemplary embodiment, for creating a quota tree in a file system.

FIG. 5 is a flow diagram of a general overview of a method 500, in accordance with an exemplary embodiment, for creating a quota tree in a file system. In an exemplary embodiment, the method 500 may be implemented by the quota tree replication module 202 and employed in the storage server 152 depicted in FIG. 2. In reference to FIG. 5, upon creation of a file system, a quota tree metafile is also created at 502 to store various information about quota trees in a particular volume. As discussed above, in one embodiment, the quota tree metafile stores information such as quota tree identifiers, root directory inode identifiers, and references to locations of inode grouped data structures.

Additionally, an inode grouped data structure is created for a root directory at 504 where, as discussed previously, the inode grouped data structure includes a set of inode identifiers as an index to locate the inode data structure or effectively, the metadata. The following Table B is an example of a directory in a file system:

TABLE B

| Name of Data Container | Inode identifier |
|---|---|
| f1 | 0 |
| f2 | 2 |

As depicted in Table B, the directory includes two data containers, namely "f1" and "f2." The data containers are stored in the following inode grouped data structures depicted in Table C:

TABLE C

| Inode identifier | Inode Data Structure |
|---|---|
| 0 | Details of f1:<br>Type<br>Permission<br>Storage Quota<br>User Identifier and Group Identifier |
| 1 | Unused |
| 2 | Details of f2:<br>Type<br>Permission<br>Storage Quota<br>User Identifier and Group Identifier |

The inode grouped data structure is at a known location in the file system (e.g., non-volatile memory, hard disk, or other storage devices). As depicted in Table C, the metadata are stored in the inode data structures at locations 0 and 2.

Still referring to FIG. 5, a root directory inode identifier and a quota tree identifier are assigned to the root directory at 506 and 508, respectively. The newly assigned root directory inode identifier, quota tree identifier, and a reference to a location of the newly created inode grouped data structure are then added as an entry in the quota tree metafile at 510.

Figure 6:
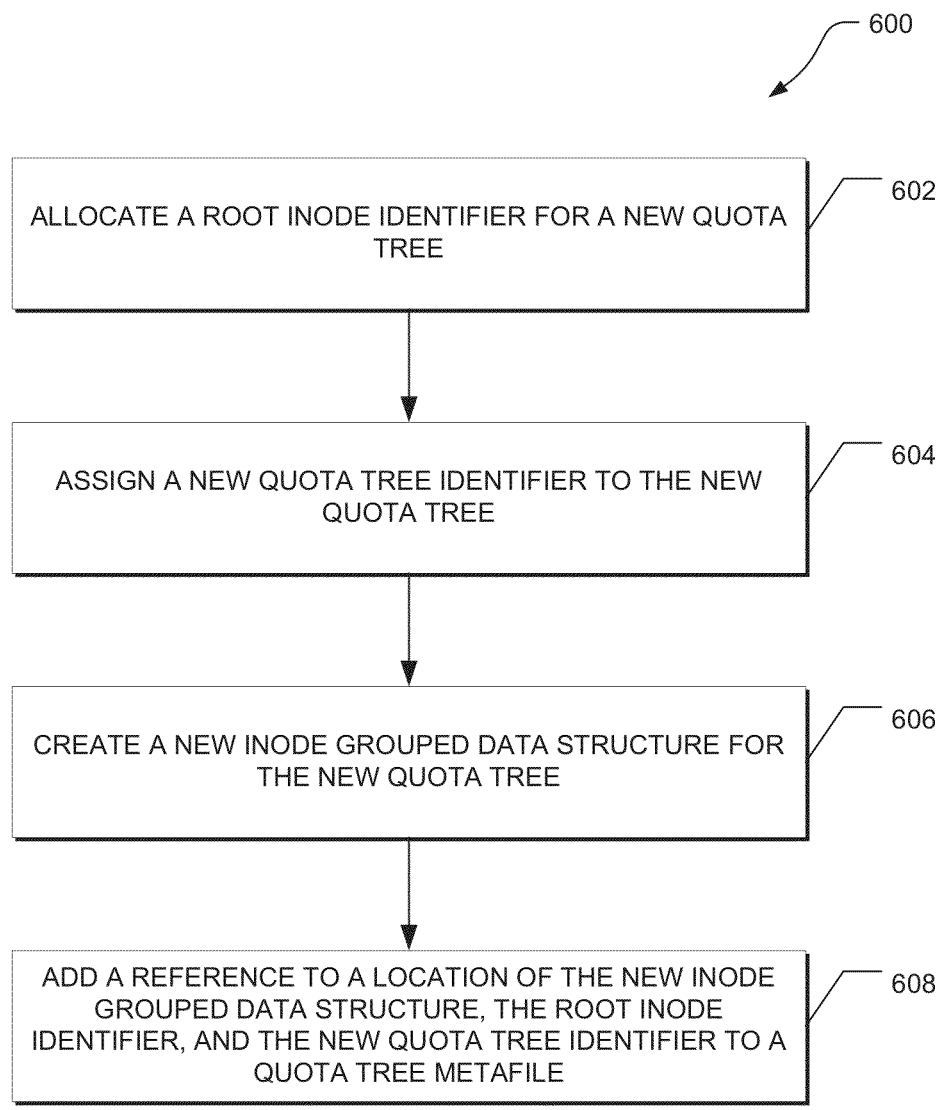
FIG. 6 is a flow diagram of a general overview of a method, in accordance with an exemplary embodiment, for creating a new quota tree or copying an existing quota tree.

FIG. 6 is a flow diagram of a general overview of a method 600, in accordance with an exemplary embodiment, for creating a new quota tree or copying an existing quota tree. In an exemplary embodiment, the method 600 may be implemented by the quota tree replication module 202 and employed in the storage server 152 depicted in FIG. 2. In the method 600 depicted in FIG. 6, a file system and a quota tree metafile have already been created. Additionally, a quota tree has already been created for a root directory having a set of inode identifiers that are stored in its inode grouped data structure. A root directory inode identifier from this set of inode identifiers is allocated to a new quota tree at 602.

Furthermore, a unique quota tree identifier is assigned to the new quota tree at 604. It should be noted that each root directory inode identifier corresponds to a quota tree identifier. This quota tree identifier serves as an index into the quota tree metafile. The root directory of the quota tree is initialized with the new quota tree identifier allocated during the creation of the quota tree. Subsequently, the data containers and/or directory inherit the quota tree identifier from the parent.

Still referring to FIG. 6, a new inode grouped data structure is created for the new quota tree at 606. In one embodiment, if the new quota tree is not a copy of another existing quota tree, then the new inode grouped data structure can store any inode identifiers that can be used to index inode data structures. In an alternate embodiment, if the new quota tree is a copy of an existing quota tree, then the new inode grouped data structure stores a set of inode identifiers that are identical to the set of inode identifiers associated with the existing quota tree. That is, multiple sets of inode identifiers defined between at least two inode grouped data structures can be identical. A reference to a location of the new inode grouped data structure, the new quota tree identifier, and the root directory inode identifier are then added as an entry in the quota tree metafile at 608.

Figure 7:
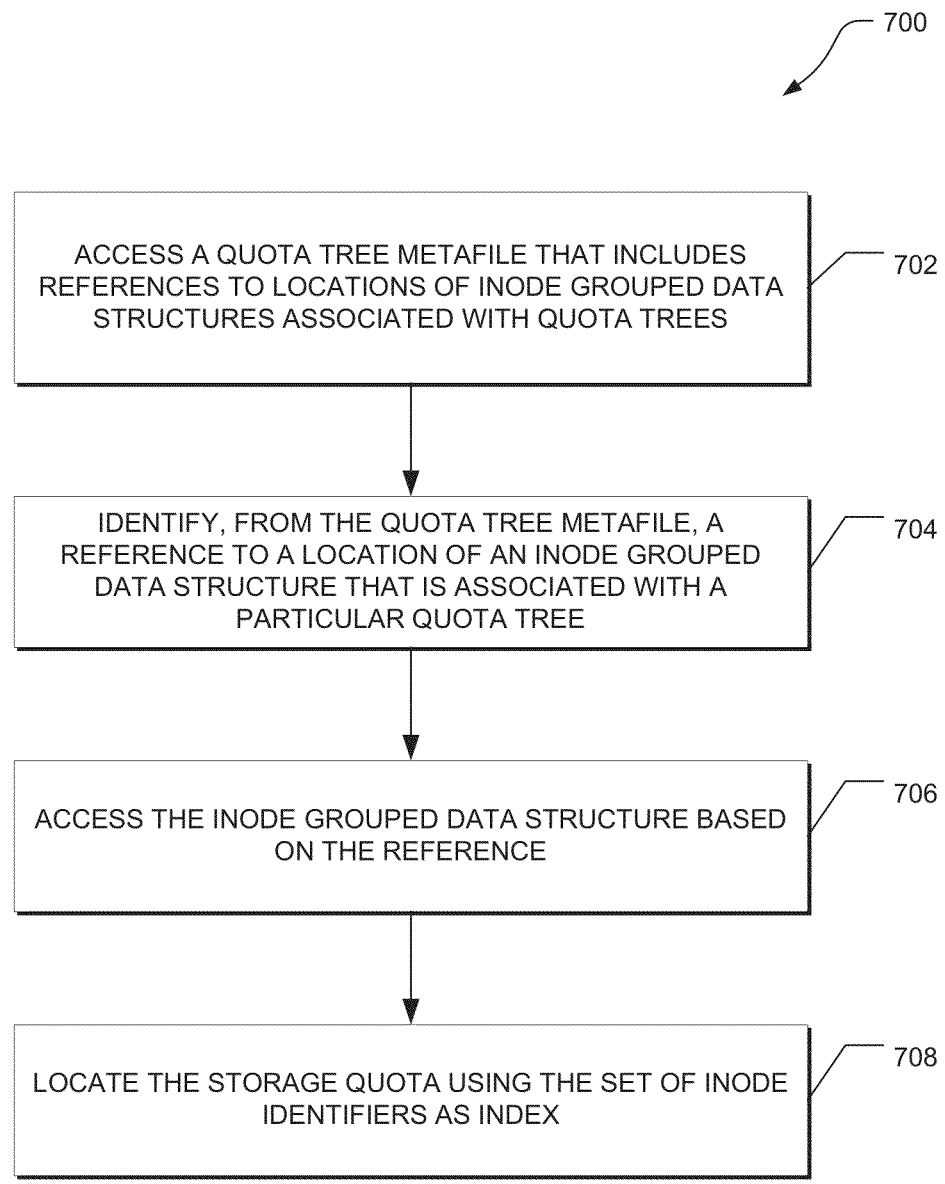
FIG. 7 is a flow diagram of a general overview of a method, in accordance with an exemplary embodiment of the present invention, for accessing a quota tree to identify an inode grouped data structure.

FIG. 7 is a flow diagram of a general overview of a method 700, in accordance with an exemplary embodiment of the present invention, for accessing a quota tree to identify metadata. In an exemplary embodiment, the method 700 may be implemented by the quota tree replication module 202 and employed in the storage server 152 depicted in FIG. 2. In method 700, a quota tree metafile that includes references to locations of inode grouped data structures is accessed at 702. As discussed previously, each quota tree has or is allocated an inode grouped data structure, and a reference to a location of each inode grouped data structure is stored in the quota tree metafile. In addition to the references, the quota tree metafile additionally stores quota tree identifiers and root directory inode identifiers.

From the quota tree metafile, a reference to a location of an inode grouped data structure that is associated with a particular quota tree is identified at 704, and the inode grouped data structure is then accessed at 706 based on this reference. This accessed inode grouped data structure is stored in a file system and includes a set of inode identifiers that are associated with the quota tree. At 708, metadata (e.g., storage quota) can be located using the set of inode identifiers as index.

Figure 8:
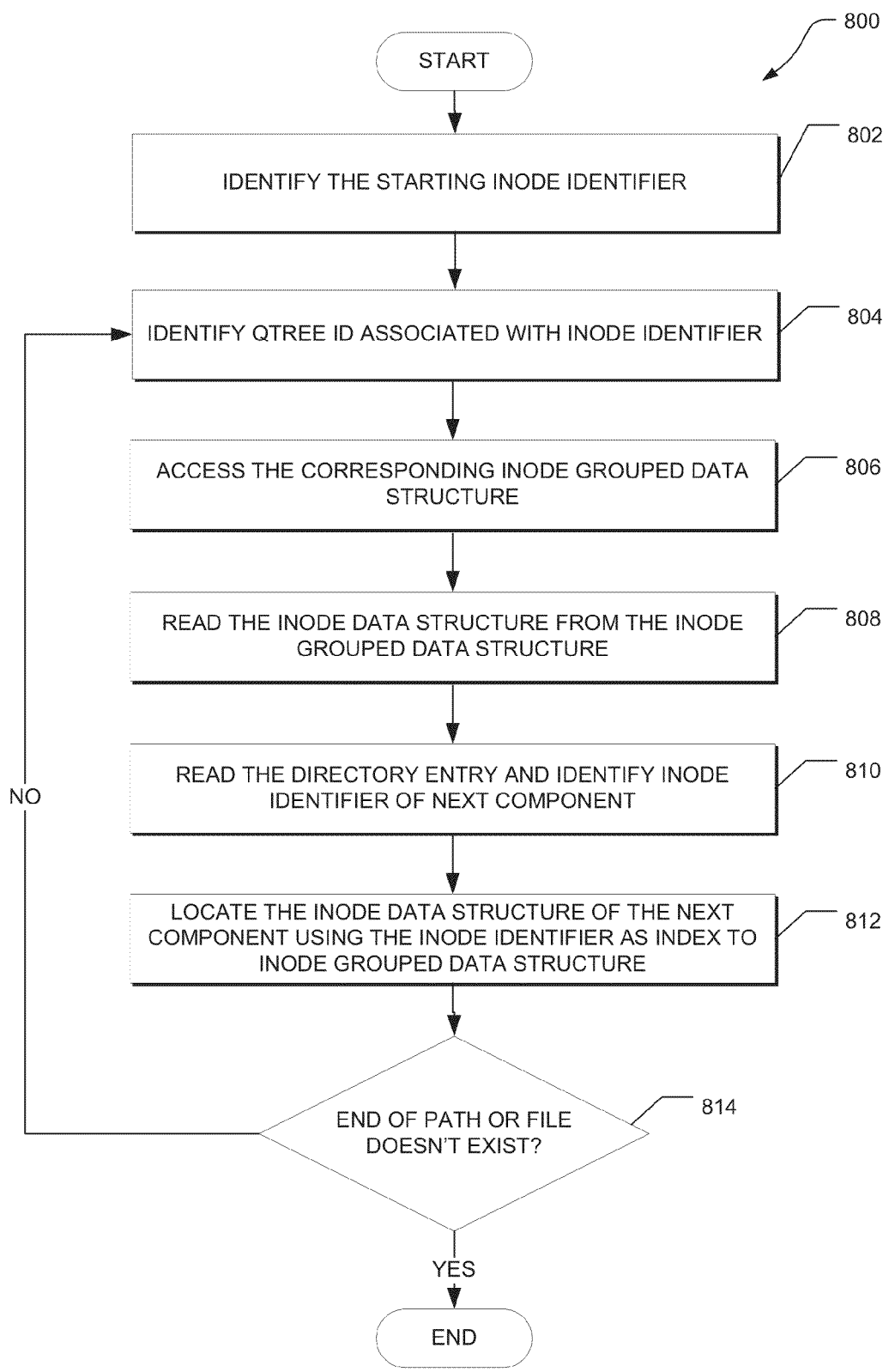
FIG. 8 is a flow diagram of a detailed method, in accordance with an exemplary embodiment of the present invention, for accessing a quota tree to identify an inode grouped data structure.

FIG. 8 is a flow diagram of a detailed method 800, in accordance with an exemplary embodiment of the present invention, for accessing a quota tree to identify metadata. In this detailed method 800, a directory path identifier is initially accessed, and this directory path identifier includes at least one root directory. As depicted at 802, the inode identifier to start the search of directory path is identified (either current working directory of the process or root of the file system). Thereafter, a quota tree identifier associated with the inode identifier is identified from the quota tree metafile at 804. Using the quota tree identifier as index into the quota tree metafile, a reference to a location of the corresponding inode grouped data structure is identified and, at 806, the corresponding inode grouped data structure is accessed from that location.

This inode grouped data structure includes a set of inode identifiers associated with the quota tree. The inode data structure associated with a current inode identifier is then read at 808 from the inode grouped data structure. This inode identifier might correspond to the root directory inode identifier in the quota tree metafile. The directory entry is then read, and the inode identifier of the next component in the directory entry is identified at 810. The inode data structure of this next component is then located at 812 in the inode grouped data structure using the inode identifier as index.

Still referring to FIG. 8, a check is then made at 814 to determine whether the end of the directory path has been reached or whether the referenced data container does not exist. If the directory path has reached the end or the data container does not exist, then the method 800 ends. Metadata can be located by referencing the set of inode identifiers stored in the inode grouped data structure accessed at 806. However, if the directory path has not reached the end, then operations at 804, 806, 808, 810, and 812 are repeated.

Figure 9:
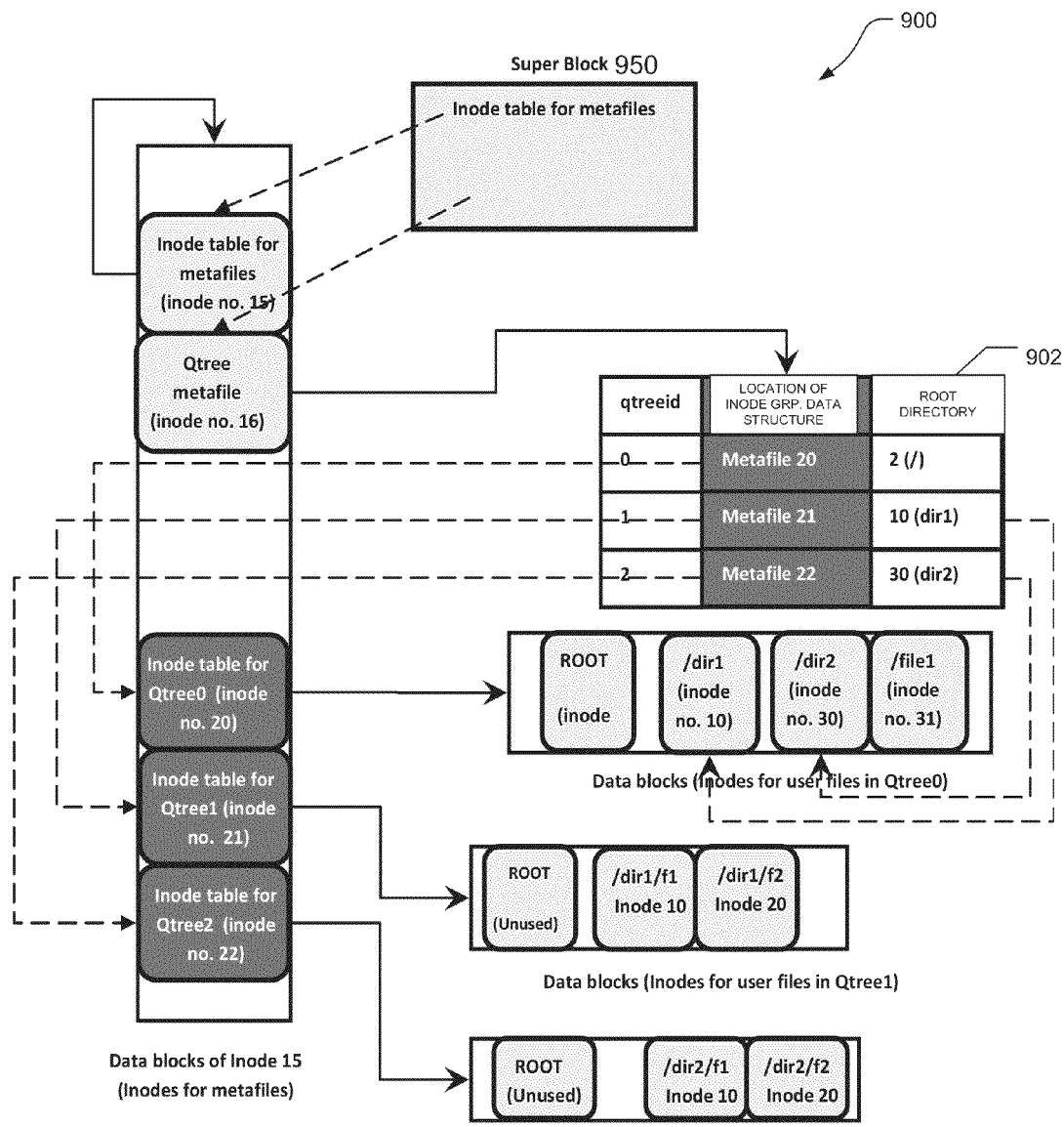
FIG. 9 is a data block diagram of a file system that supports quota trees, in accordance with an exemplary embodiment of the present invention.

FIG. 9 is a data block diagram of a file system that supports quota trees, in accordance with an exemplary embodiment of the present invention. As depicted, the file system 900 includes various data blocks associated with inode identifiers 15 and 16. A super block 950 stores various information about the file system, such as a size of the file system and location of metadata on the disk. Inode identifiers 15 and 16 are allocated from inode grouped data structures and reference metadata. Data blocks of inode identifier 15 store metadata, where data blocks of inode identifier 16 store details of quota trees in the file system. The quota tree metafile 902 stores quota tree identifiers, root directory inode identifiers, and references to locations of inode grouped data structures. Each inode grouped data structure stores a set of inode identifiers that are associated with a particular quota tree, such as quota tree 0, 1, or 2.

In the example depicted in FIG. 9, in order to identify metadata associated with directory path "/dir1/f2," the detailed method 800 described in FIG. 8 for accessing a quota tree can be followed. This directory path identifier "/dir1/f2" includes a root directory "/." From the quota tree metafile 902, a root directory inode identifier "2" is identified to be associated with the root directory "/." Thereafter, the quota tree identifier "0" associated with the root directory inode identifier "2" is identified from the quota tree metafile 902. Using the quota tree identifier "0" as index into the quota tree metafile 902, a reference to a location of the corresponding inode grouped data structure "Metafile 20," which is embodied within an inode grouped table "Inode table," is identified, and this corresponding inode grouped data structure "Metafile 20" is accessed from that location.

This inode grouped data structure "Metafile 20" includes a set of inode identifiers 10, 30, and 31 allocated to directory paths "/dir1," "/dir2," and "/file1," respectively. The inode identifier "10" assigned to root directory path "/dir1" is identified as a next component after root directory "/," and the inode identifier "10" assigned to this next component "/dir1" is identified from the inode grouped data structure "Metafile 20."

A check is then made to determine whether the end of the directory path "/dir1/f2" has been reached or whether the data container "f2" does not exist. In this example, the end of the directory path "/dir/f2" has not been reached because "/f2" still exists and therefore, the quota tree identifier "1" associated with the root directory inode identifier "10" is identified from the quota tree metafile 902. As discussed previously, the root inode identifier "10" is identified from Metafile 20 as the inode identifier allocated to root directory path "/dir1."

Using the quota tree identifier "1" as index into the quota tree metafile 902, a reference to a location of a corresponding inode grouped data structure "Metafile 21," which is embodied within an inode grouped table "Mode table," is identified, and this corresponding inode data structure "Metafile 21" is accessed from that location. The inode data structure "Metafile 21" includes a set of inode identifiers associated with the quota tree identified by quota tree identifier "1." As depicted, the set of inode identifiers read from the inode grouped data structure "Metafile 21" are 10 and 20, allocated to directory paths "/dir1/f1" and "/dir1/f2," respectively. The inode identifier "20" assigned to directory path "/dir1/f2" is identified as a next directory component after directory path "/dir1," and inode identifier "20" assigned to this next component "/dir1/f2" is identified from the inode grouped data structure "Metafile 21."

Another check is then made to determine whether the end of the directory path "/dir1/f2" has been reached, and in this example, the end of the directory path "/dir1/f2" has been reached. Therefore, the inode identifier "20" in quota tree 1 can be used as an index to locate the metadata for directory path "/dir1/f2."

Figure 10:
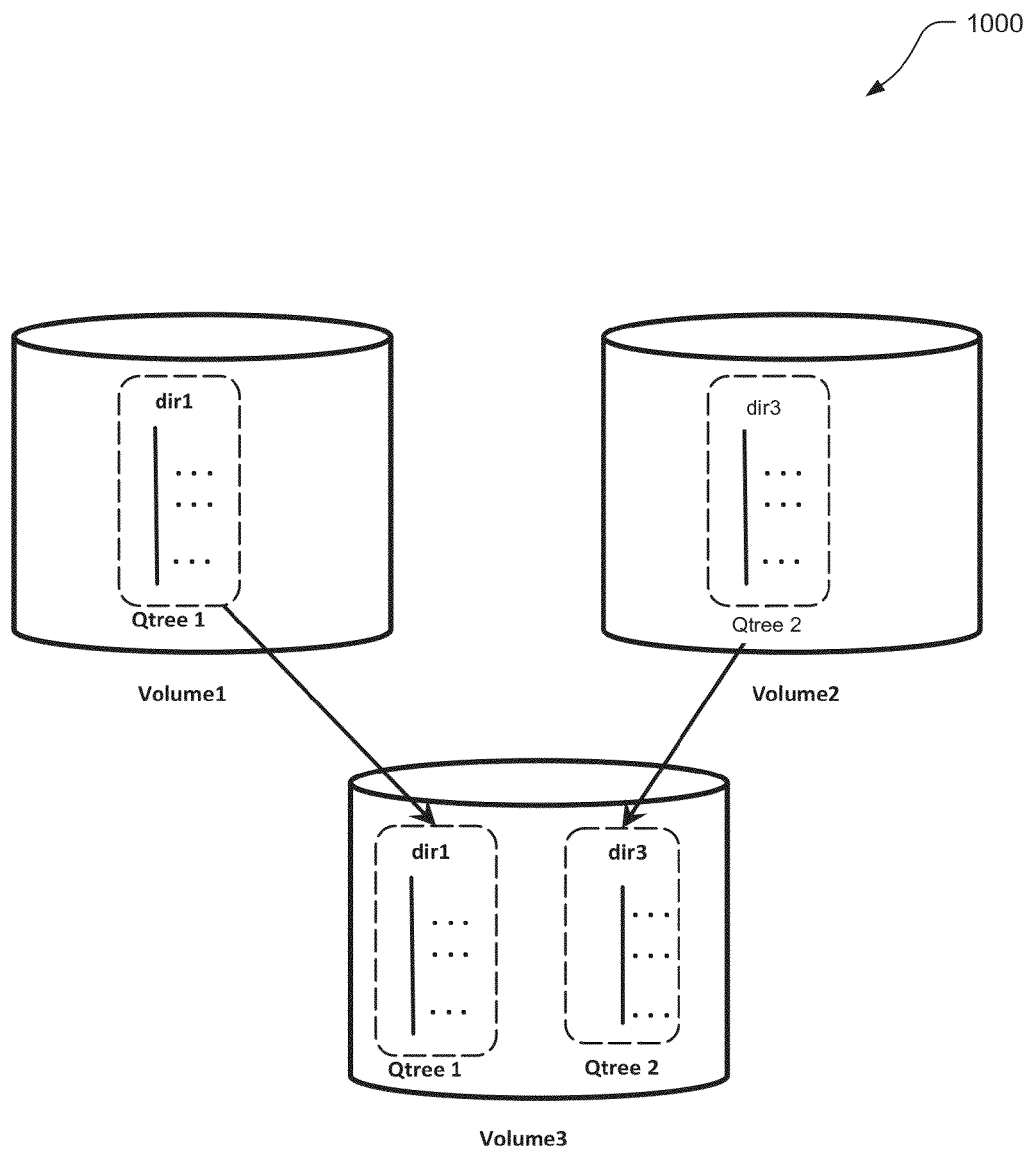
FIG. 10 is a diagram of a system depicting a "fan-in" copy of quota trees, in accordance with an exemplary embodiment of the present invention.

FIG. 10 is a diagram of a system 1000 depicting a "fan-in" copy of quota trees, in accordance with an exemplary embodiment of the present invention. The system 1000 includes three or more volumes, namely volume 1, 2, and 3. As a result of maintaining an inode grouped data structure for each quota tree, the same inode identifiers can be repeated for different quota trees. As a result, the "fan-in" copy of quota trees can be supported. In a fan-in copy, quota trees stored in different volumes can be copied to a single volume. That is, a single volume can host copies of the multiple quota trees.

For example, as depicted in FIG. 10, quota tree 1 is stored in volume 1 while quota tree 2 is stored in volume 2. In a "fan-in" copy, quota trees 1 and 2 can be copied to a single volume 3. Here, all the quota trees 1 and 2 stored on volumes 1, 2, and 3 can have identical inode identifiers. Specifically, the inode identifiers in quota tree 1 on volume 3 will be identical to inode identifiers in quota tree 1 on volume 1. Similarly, inode identifiers in quota tree 2 on volume 3 will be identical to inode identifiers in quota tree 2 on volume 2. In one example, such a fan-in copy can be used for used for vaulting, where quota trees 1 and 2 can be restored to their respective volumes 1 and 2 from volume 3 in case the primary copies of the quota trees 1 and 2 stored on volumes 1 and 2 fail.

Figure 11:
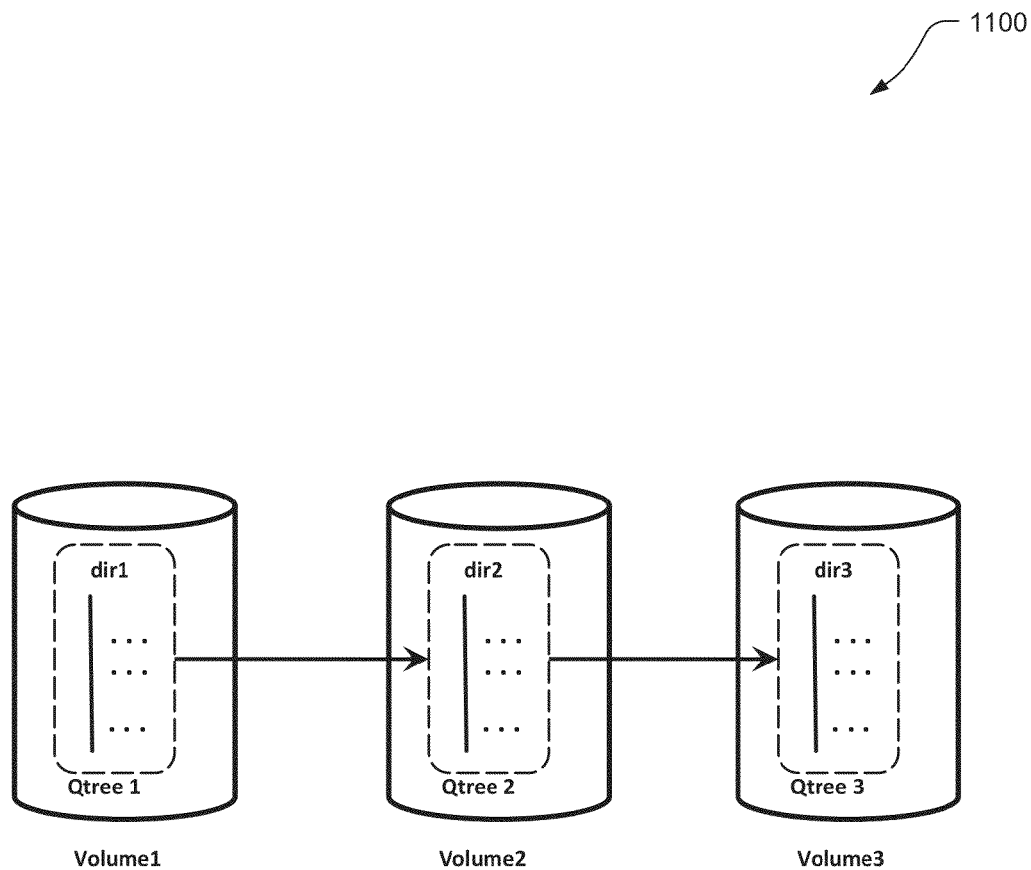
FIG. 11 is a diagram of a different system depicting a "cascade" copy of quota trees, in accordance with an alternative embodiment of the present invention.

FIG. 11 is a diagram of a different system 1100 depicting a "cascade" copy of quota trees, in accordance with an alternative embodiment of the present invention. The system 1100 includes three volumes, namely volume 1, 2, and 3. Each volume 1, 2, or 3 stores a quota tree 1, 2, or 3, respectively. In a cascade copy, secondary copy of a primary quota tree is used to create a tertiary copy. For example, as depicted in FIG. 11, quota tree 2, which is a secondary copy of primary quota tree 1, can be used to create quota tree 3, which is a tertiary copy of primary quota tree 1. As a result of maintaining an inode grouped data structure for each quota tree 1, 2, or 3, the same inode identifiers can be repeated for different quota trees 1, 2, and 3, thereby allowing cascade copies of quota tree 1 to be made having the same set of inode identifiers. As a result, upon restoring quota tree 1 from either quota tree 2 or 3 in case of a failover, there is no difference between the primary, secondary, and tertiary copies.

Figure 12:
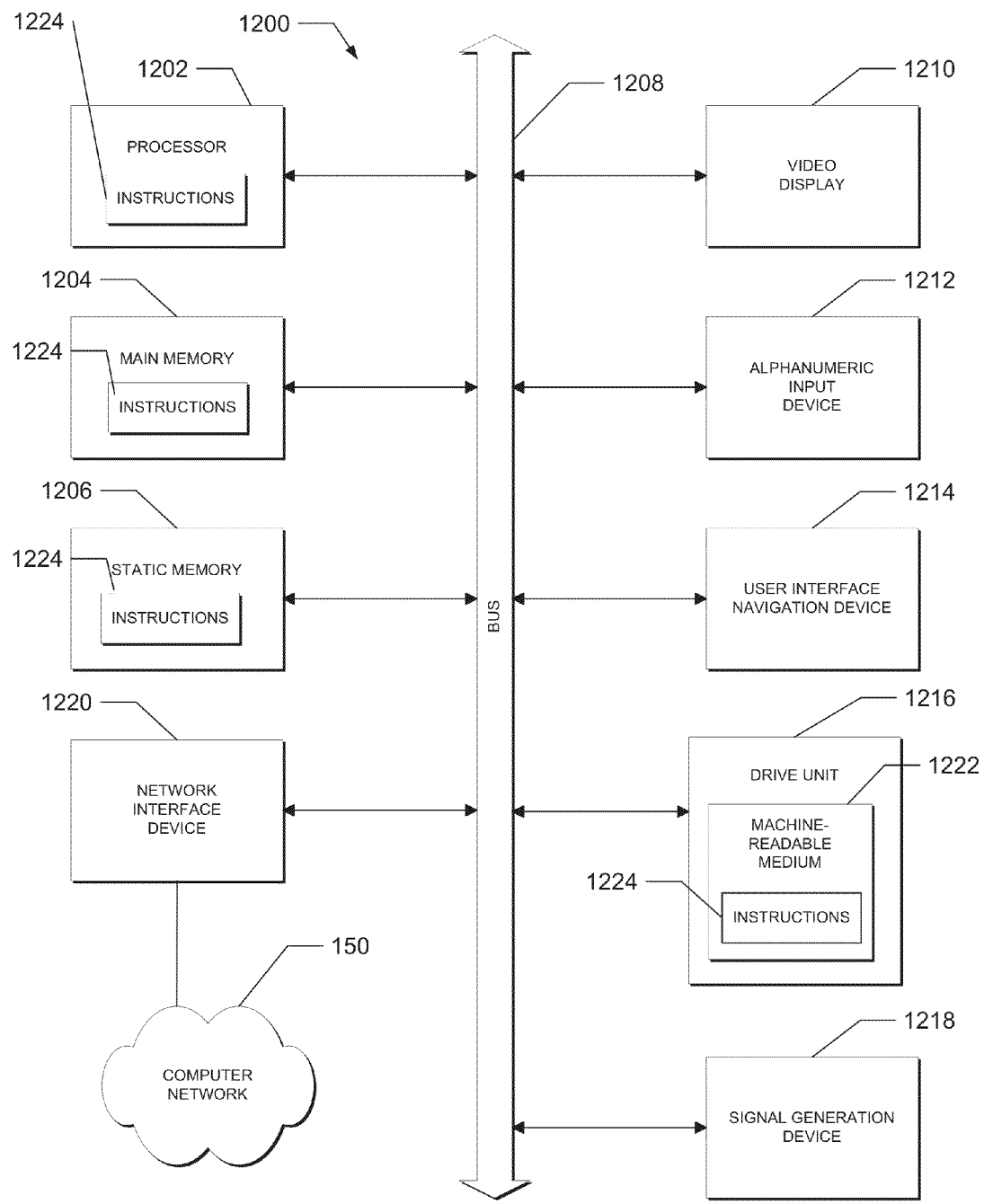
FIG. 12 depicts a hardware block diagram of a machine in the example form of a computing device within which may be executed a set of instructions for causing the machine to perform any one or more of the methodologies discussed herein.

FIG. 12 depicts a hardware block diagram of a machine in the example form of a computing device 1200 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computing device 1200 includes a processor 1202 (e.g., a central processing unit (CPU), a graphics processing unit (GPU) or both), a main memory 1204 (e.g., random access memory), and a static memory 1206 (e.g., static random access memory), which communicate with each other via bus 1208. The computing device 1200 may further include video display unit 1210 (e.g., a plasma display, a liquid crystal display (LCD) or a cathode ray tube (CRT)). The computing device 1200 also includes an alphanumeric input device 1212 (e.g., a keyboard), a user interface (UI) navigation device 1214 (e.g., a mouse), a disk drive unit 1216, a signal generation device 1218 (e.g., a speaker), and a network interface device 1220.

The disk drive unit 1216 (a type of non-volatile memory storage) includes a machine-readable medium 1222 on which is stored one or more sets of data structures and instructions 1224 (e.g., software) embodying or utilized by any one or more of the methodologies or functions described herein. The data structures and instructions 1224 may also reside, completely or at least partially, within the main memory 1204 and/or within the processor 1202 during execution thereof by computing device 1200, with the main memory 1204 and processor 1202 also constituting machine-readable, tangible media.

The data structures and instructions 1224 may further be transmitted or received over a computer network 150 via network interface device 1220 utilizing any one of a number of well-known transfer protocols (e.g., HyperText Transfer Protocol (HTTP)).

Certain embodiments are described herein as including logic or a number of components, modules, or mechanisms. Modules may constitute software modules (e.g., code embodied on a machine-readable medium or in a transmission signal) and/or hardware modules. A hardware module is a tangible unit capable of performing certain operations and may be configured or arranged in a certain manner. In exemplary embodiments, one or more computer systems (e.g., the computing device 1200) or one or more hardware modules of a computer system (e.g., a processor 1202 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an ASIC to perform certain operations. A hardware module may also comprise programmable logic or circuitry (e.g., as encompassed within a general-purpose processor 1202 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 1202 configured using software, the general-purpose processor 1202 may be configured as respective different hardware modules at different times. Software may accordingly configure a processor 1202, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation, and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 1202 that are temporarily configured (e.g., by software) or permanently configured to perform the relevant operations. Whether temporarily or permanently configured, such processors 1202 may constitute processor-implemented modules that operate to perform one or more operations or functions. The modules referred to herein may, in some exemplary embodiments, comprise processor-implemented modules.

Similarly, the methods described herein may be at least partially processor-implemented. For example, at least some of the operations of a method may be performed by one or more processors 1202 or processor-implemented modules. The performance of certain of the operations may be distributed among the one or more processors 1202, not only residing within a single machine, but deployed across a number of machines. In some exemplary embodiments, the processors 1202 may be located in a single location (e.g., within a home environment, an office environment or as a server farm), while in other embodiments the processors 1202 may be distributed across a number of locations.

While the embodiment(s) is (are) described with reference to various implementations and exploitations, it will be understood that these embodiments are illustrative and that the scope of the embodiment(s) is not limited to them. In general, techniques for the creation and access of quota trees in a file system may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A method of identifying metadata referenced by a target quota tree, the method comprising:

accessing a quota tree metafile that includes a reference to a location of an inode grouped data structure for each of a plurality of quota trees in a file system, wherein each of the inode grouped data structures stores (i) a set of inode identifiers that includes an inode identifier for each data container associated with the inode grouped data structure's corresponding quota tree, and (ii) a separately indexed metadata entry for each of the inode identifiers in the set;

identifying, from the quota tree metafile, the reference to the location of the inode grouped data structure for the target quota tree, wherein the target quota tree is one of the plurality of quota trees in the file system;

accessing the inode grouped data structure based on the reference; and locating the metadata referenced by the target quota tree using at least one of the inode identifiers from the set of inode identifiers as an index for the separately indexed metadata entries.

2. The method of claim 1, further comprising:

accessing a directory path identifier that includes a root directory;

identifying, from the inode grouped data structure, a root directory inode identifier associated with the root directory;

identifying, from the quota tree metafile, a quota tree identifier associated with the root directory inode identifier;

identifying, from the quota tree metafile, an additional reference to a location of an additional inode grouped data structure using the quota tree identifier as the index; and accessing the additional inode grouped data structure based on the additional reference, the additional inode grouped data structure defining an additional set of inode identifiers associated with an additional quota tree, wherein the metadata is located using the additional set of inode identifiers as the index.

3. The method of claim 1, wherein the quota tree metafile additionally includes quota tree identifiers and root directory inode identifiers that are associated with the references to the locations of the inode grouped data structures; and wherein the root directory inode identifiers are unique.

4. The method of claim 1, wherein a number of the sets of inode identifiers defined between at least two inode grouped data structures are identical.

5. The method of claim 1, wherein the quota tree metafile stores information regarding all quota trees in a single volume of a storage device, and wherein each volume of the storage device contains a single quota tree metafile.

6. A method of creating a quota tree in a file system, the method comprising:
creating a quota tree metafile;
creating an inode grouped data structure for a root directory, the inode grouped data structure including (i) a set of inode identifiers that includes an inode identifier for each data container associated with the inode grouped data structure's corresponding quota tree, and (ii) a separately indexed metadata entry for each of the inode identifiers in the set;
assigning a root directory inode identifier to the root directory;
assigning a quota tree identifier to the root directory; and
adding a reference to a location of the inode grouped data structure, the root directory inode identifier, and the quota tree identifier to the quota tree metafile.

7. The method of claim 6, wherein an inode identifier in the set of inode identifiers identifies a unique quota tree.

8. The method of claim 6, further comprising:
allocating a second root directory inode identifier from the set of inode identifiers to a second quota tree;
assigning a second quota tree identifier to the second quota tree;
creating a second inode grouped data structure for the second quota tree, the second inode grouped data structure including a second set of inode identifiers; and
adding a reference to a location of the second inode grouped data structure, the second root directory inode identifier, and the second quota tree identifier to the quota tree metafile.

9. The method of claim 8, wherein the root directory inode identifier and the second root directory inode identifier are unique.

10. The method of claim 8, wherein the quota tree identifier and the second quota tree identifier are unique.

11. The method of claim 8, further comprising:
allocating a third root directory inode identifier from the set of inode identifiers to a third quota tree that is a copy of the second quota tree;
assigning a third quota tree identifier to the third quota tree;
creating a third inode grouped data structure for the third quota tree, the third inode grouped data structure including a third set of inode identifiers that is identical to the second set of inode identifiers; and
adding a reference to a location of the third inode grouped data structure, the third root directory inode identifier, and the third quota tree identifier to the quota tree metafile.

12. The method of claim 11, wherein the second quota tree is stored in a first volume and the third quota tree is stored in a second volume.

13. The method of claim 6, further comprising:
copying the quota tree from a first volume to a second volume;
creating a secondary inode grouped data structure for a secondary quota tree on the second volume which contains an identical set of inode identifiers as the inode grouped data structure for the quota tree on the first volume;
copying the secondary quota tree on the second volume to a third volume;
creating a tertiary new inode grouped data structure for a tertiary quota tree on the third volume which contains an identical set of inode identifiers as the inode grouped data structures for the quota trees on the first and second volumes; and
using the tertiary quota tree as part of a process to restore data on the first volume.

14. A non-transitory, machine-readable medium that stores instructions, which, when performed by a machine, cause the machine to perform operations comprising:
accessing a quota tree metafile that includes a reference to a location of an inode grouped data structure for each of a plurality of quota trees in a file system, wherein each of the inode grouped data structures stores (i) a set of inode identifiers that includes an inode identifier for each data container associated with the inode grouped data structure's corresponding quota tree, and (ii) a separately indexed metadata entry for each of the inode identifiers in the set;
identifying, from the quota tree metafile, the reference to the location of the inode grouped data structure for a target quota tree, wherein the target quota tree is one of the plurality of quota trees in the file system;
accessing the inode grouped data structure based on the reference; and
locating metadata referenced by the target quota tree using at least one of the inode identifiers from the set of inode identifiers as an index for the separately indexed metadata entries.

15. The non-transitory, machine-readable medium of claim 14, further comprising instructions that cause the machine to perform operations including:
accessing a directory path identifier that includes a root directory;
identifying, from the inode grouped data structure, a root directory inode identifier associated with the root directory;
identifying, from the quota tree metafile, a quota tree identifier associated with the root directory inode identifier;
identifying, from the quota tree metafile, an additional reference to a location of an additional inode grouped data structure using the quota tree identifier as the index; and
accessing the additional inode grouped data structure based on the additional reference, the additional inode grouped data structure defining an additional set of inode identifiers associated with an additional quota tree,
wherein the metadata is located using the additional set of inode identifiers as the index.

16. The non-transitory, machine-readable medium of claim 14, wherein the quota tree metafile additionally includes quota tree identifiers and root directory inode identifiers that are associated with the references to the locations of the inode grouped data structures; and
wherein the root directory inode identifiers are unique.

17. The non-transitory, machine-readable medium of claim 14, wherein the inode grouped data structures include sets of inode identifiers; and
wherein a number of the sets of inode identifiers defined between at least two inode grouped data structures are identical.

18. The non-transitory, machine-readable medium of claim 14, wherein the quota tree metafile stores information regarding all quota trees in a single volume of a storage device, and wherein each volume of the storage device contains a single quota tree metafile.

19. A computing device comprising:
a processor; and
a memory in communication with the processor, the memory being configured to store a quota tree replication module that is executable by the processor, the quota tree replication module having instructions that when executed by the processor, cause operations to be performed, the operations comprising:

creating a quota tree metafile;

creating an inode grouped data structure for a root directory, the inode grouped data structure including (i) a set of inode identifiers that includes an inode identifier for each data container associated with the inode grouped data structure's corresponding quota tree, and (ii) a separately indexed metadata entry for each of the inode identifiers in the set;

assigning a root directory inode identifier to the root directory;

assigning a quota tree identifier to the root directory; and adding a reference to a location of the inode grouped data structure, the root directory inode identifier, and the quota tree identifier to the quota tree metafile.

20. The computing device of claim 19, wherein the operations further comprise:

allocating a second root directory inode identifier from the set of inode identifiers to a second quota tree;

assigning a second quota tree identifier to the second quota tree;

creating a second inode grouped data structure for the second quota tree, the second inode grouped data structure including a second set of inode identifiers; and adding a reference to a location of the second inode grouped data structure, the second root directory inode identifier, and the second quota tree identifier to the quota tree metafile.

21. The computing device of claim 19, wherein the operations further comprise:

copying a quota tree from a first volume to a second volume;

creating a secondary inode grouped data structure for a secondary quota tree on the second volume which contains an identical set of inode identifiers as the inode grouped data structure for the quota tree on the first volume;

copying the secondary quota tree on the second volume to a third volume;

creating a tertiary new inode grouped data structure for a tertiary quota tree on the third volume which contains an identical set of inode identifiers as the inode grouped data structures for the quota trees on the first and second volumes; and using the tertiary quota tree as part of a process to restore data on the first volume.

* * * * *